July 12, 1949.  A. H. KIDDER  2,475,788
TEMPERATURE INDICATING ARTIFICE
Filed May 27, 1944  2 Sheets-Sheet 1

INVENTOR.
ALLAN H. KIDDER
BY
Augustus B Stoughton
ATTORNEY

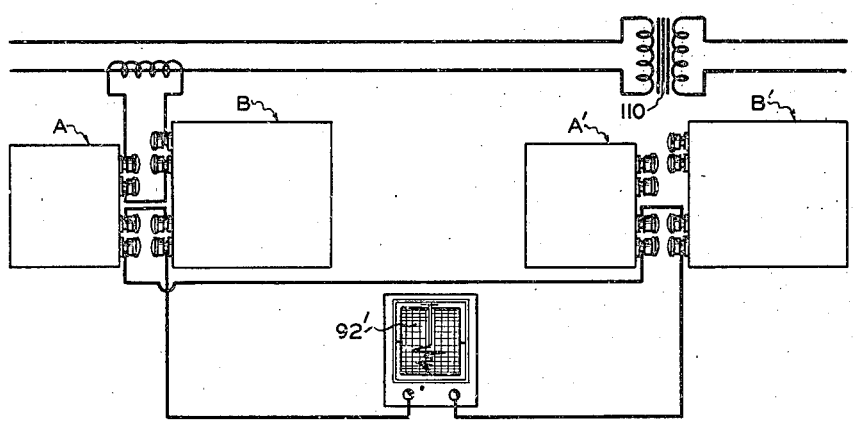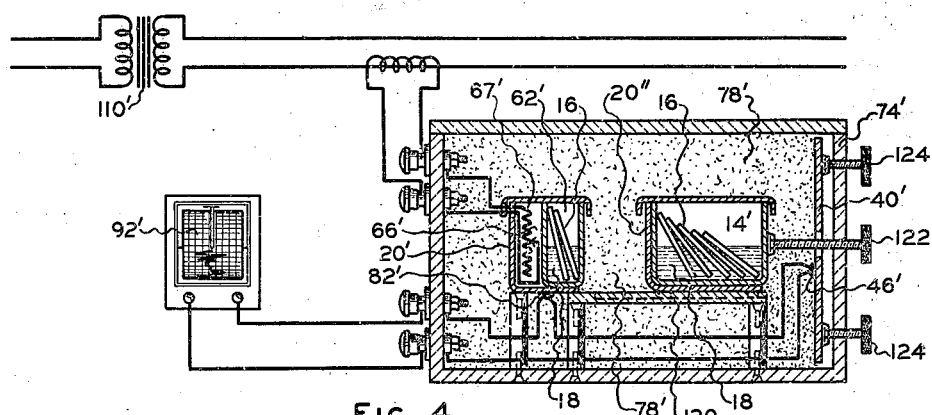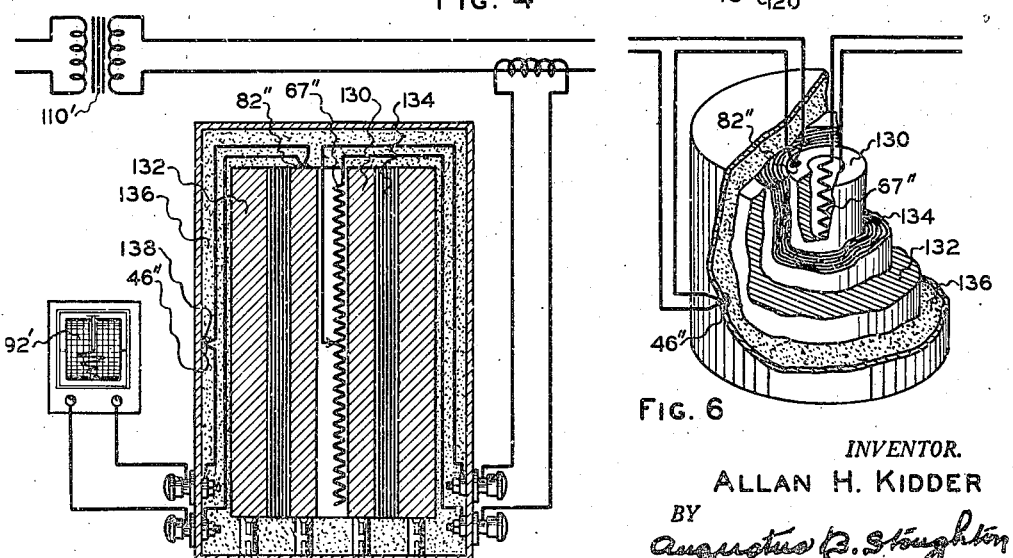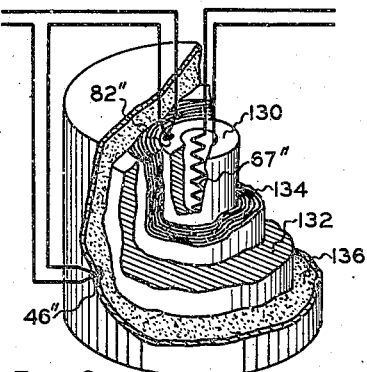

Patented July 12, 1949

2,475,788

UNITED STATES PATENT OFFICE 2,475,788

TEMPERATURE INDICATING ARTIFICE

Allan H. Kidder, Yeadon, Pa.

Application May 27, 1944, Serial No. 537,575

17 Claims. (Cl. 73—350)

My invention relates to the control of electrical equipment to prevent overloading, and, more specifically, relates to a hot-spot temperature indicating device.

The thermal load capacity of electrical equipment is reached when some spot therein attains a temperature just below that at which excessive deterioration would occur. The temperature of this spot at any time is the sum of the particular ambient or initial temperature at the spot and the temperature-rise caused by the particular sequence of loads that is commonly called the load cycle.

It is often desirable, particularly during emergencies, to use the full load capacity of the equipment as limited by its permissible temperature-rise. Heretofore, in such cases, resort has been had to calculated short-time emergency ratings. Because it is impractical to burden the operator with more than a few calculated ratings, however, the combination of circumstances under which the calculated ratings would fully utilize the maximum permissible temperature-rise occurs so rarely that the actual load capacity of the equipment may never be used.

Hot spot temperature supervision as now used for important units in relatively close proximity to the operating switchboard utilizes an electrical device located in the unit and responsive to its temperature; the device being wired to a potentiometer recorder, visible to the operator. The method is disadvantageous for indicating the temperature in equipment which is remote from the control point. The facilities are expensive to construct. Their delicate intricacy requires systematic servicing and maintenance.

The primary object of my invention is to avoid the disadvantages of the present method of hot-spot temperature supervision. Another object of my invention is to provide an artifice which produces in effect a thermal image of the equipment to be supervised. A further object of my invention is to provide simple and inexpensive means for indicating on a control switchboard the temperature-rise at the hot-spot of the equipment to be supervised, even though the hot spot may be inaccessible or remote from the switchboard.

With these and other objects in view which will become apparent as the description proceeds, my invention comprises one or more heat-cells and an associated temperature indicator, the cell or cells functioning as a thermal equivalent of the prototype equipment to be supervised, when the cell or cells are energized with current proportional in proper ratio to that in said equipment.

My indicator operates on the principle that the actual temperature-rise in any equipment can be simulated for all practical purposes by an artificial thermal circuit. The temperature-rise, $\theta$, which is the characteristic response produced by a constant rate of heat input in any thermal circuit, no matter how complex, can be represented by an equation having a plurality of terms of the form:

$$\theta = A'P(1-e^{-a't}) + B'P(1-e^{-b't}) + \ldots + NP(1-e^{-nt}) \quad (1)$$

where P represents some constant rate of heat input during $t$ hours of elapsed heating time, the parameters $A', B', \ldots N$, and $a', b' \ldots n$ are functions of the thermal capacitances (i. e., thermal masses) and thermal resistances, while $e$ is the base (2.7183) of natural logarithms.

The same temperature-rise can be represented empirically for practical purposes, however, by an equation having as few as two terms as follows:

$$\theta = AP(1-e^{-at}) + BP(1-e^{-bt}) \quad (2)$$

where the parameters $A$, $B$, $a$, and $b$ are functions of thermal capacitances and thermal resistances in an empirical thermal circuit.

It is possible to design an artificial thermal circuit having only one heater, two effective capacitances and two effective thermal resistances, whose response will be substantially that of the empirical circuit represented by Equation 2.

It is also possible as a special case to design an artificial thermal circuit having one heater, one effective thermal capacitance and one effective thermal resistance, whose characteristic response may be represented by the first or A-term of the right-hand member of Equation 2, and a similar circuit designed to have a characteristic response represented by the second or B-term. Their combined response will then be that of the empirical circuit represented by Equation 2.

The preferred embodiment of my invention is designed in accordance with the foregoing special case. Two heat-cells are used, one representing respectively the A-term and the other the B-term of Equation 2. The details of construction and combination of parts, will best be understood from the following description of the preferred embodiment which I illustrate as an example, when read in conjunction with the accompanying drawings, in which:

Fig. 3 is a schematic view of two sets of the heat cells shown in Fig. 1 arranged to measure temperature-rise compensated for transient effects of room temperature changes.

Fig. 4 is a side elevational view, partly in section, of a modification of my artifice using only one heater in a single composite cell.

Fig. 5 is a side elevational view, partly in section, of another composite cell modification of my artifice in which the parts have a non-adjustable thermal constants.

Fig. 6 is a fragmentary perspective view, partly in section, of the device of Fig. 5.

Figures 1, 2:
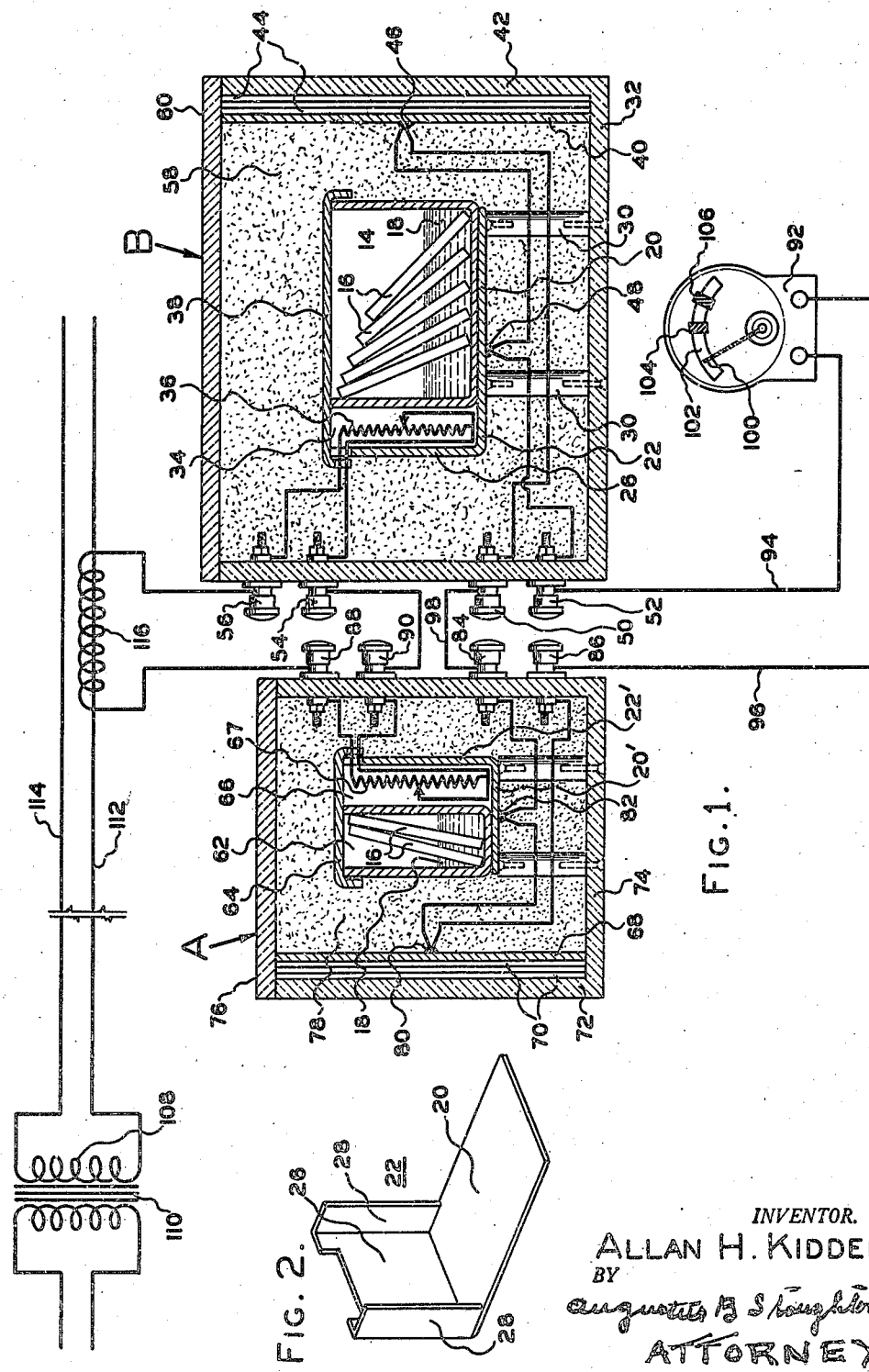
Fig. 1 is a sectional view of the temperature indicating artifice of my invention connected to an electric circuit.
Fig. 2 is a perspective view of a heat-distributor incorporated in my device.

Referring to Fig. 1, I show a large cell B of relatively large thermal mass and a small cell A of relatively small thermal mass. The cell B comprises an inner metal chamber 14 containing thermal ballast consisting of metal plates 16 and a liquid 18. The chamber 14 rests on the shoe portion 20 of a heat distributor 22, and is made fast in good thermal contact thereto. The distributor 22 includes a heater shield comprising an upright portion 26 with lateral wings 28, 28. The shoe portion 20 is mounted on thermal insulating supports 30, 30, fixed to the base of an outer enclosure 32 of insulating material.

The shield portion 26 is spaced from the chamber 14 of cell B to provide a compartment 34 which houses an adjustable heater element 36. A metal lid 38 rests on and covers the chamber 14 and the compartment 34. A metal plate 40 is positioned between the chamber 14 and one of the walls of the enclosure 32 and spaced therefrom by shims 44 of heat-insulating material.

The cell B includes a thermocouple circuit having a cold junction 46 in good thermal contact with the plate 40 and a hot junction 48 in good thermal contact with the bottom of the shoe 20. One of the two elements of which the thermocouple is comprised is continuous between the junctions 46 and 48 and the other element is brought out from each junction to terminals 50 and 52 mounted on the enclosure 32. Leads to the heater 36 are brought out to terminals 54 and 56 also mounted on the enclosure 32. The remainder of the space within the enclosure 32 external to the chamber 14 and compartment 34 is filled with thermal insulation 58. A cover 60 is provided for the enclosure 32.

The cell A is similar to the cell B, having an inner chamber 62 for thermal ballast, a heat distributor 22' with shoe 20', a lid 64, a heater compartment 66, housing an adjustable heater element 67, a metal plate 68, with spacing shims 70 adjacent to one of the walls 72 of an enclosure 74, a cover 76 and insulation 78. The thermocouple circuit in cell A includes a cold junction 80 in contact with the plate 68 and a hot junction 82 in contact with the shoe 20', one thermocouple element being continuous between the junctions 80 and 82 and the other element being brought out to the terminals 84 and 86. Leads to the heater 67 are brought out to the terminals 88 and 90.

The essential difference between cells A and B lies in the fact that the chamber 14 is larger than and has capacity for considerably more thermal ballast than chamber 62. An indicating millivoltmeter 92 is connected to terminals 52 and 86 by leads 94 and 96, respectively, and the terminals 50 and 84 are connected together by a lead 98. The indicator 92 is provided with a pointer 100 and a scale 102 graduated in degrees of temperature-rise and having a green line or band 104 and a red line or band 106, with line 104 being lower on the scale than the line 106.

The equipment containing the part whose temperature-rise is to be indicated, for example, a point 108 on the winding of power transformer 110, is illustrated as connected in an electric circuit having conductors 112 and 114. The primary of a current transformer 116 is connected in series with the conductor 112. The secondary of the current transformer 116 is connected in series with the heaters 36 and 67, by connecting the current transformer secondary leads to the terminals 56 and 88, and interconnecting the terminals 54 and 90.

The calibration of this device for indicating the temperature-rise of the point 108, is as follows: The curve of temperature-rise versus time after application of a constant current load, is determined for the point 108 whose temperature-rise is desired to be indicated. Although this curve may be expressed exactly by an equation of the form of Equation 1, I find that it may, in general, be represented for all practical purposes by an equation of the form of Equation 2, whose parameters are determined empirically by direct analysis of said curve. This method of empirical analysis is developed and illustrated in detail in Appendix "A" of my paper entitled "Notes on emergency ratings" which was published in the Transactions of the American Institute of Electrical Engineers, November 1939, volume 58, at page 606. The parameters of Equation 2, established in this manner, determine the thermal constants for which the various parts of my device are to be adjusted.

The small cell A is designed to represent the A-term and the large cell B the B-term of Equation 2. The factor P is the watts copper losses in the transformer 110. For constant load on the transformer, the ultimate or final steady-state temperature-rise at the point 108 is the sum of the products AP and BP, where the parameters A and B are in units of thermal resistance, i. e., degrees temperature-rise per watt. Each of the cells A and B, is designed to have a predetermined effective thermal resistance between the respective hot and cold junctions, for example, approximately 12 degrees centigrade rise per watt dissipated in the heater under steady-state conditions.

In the small cell A, I adjust the heater 67 so that the product, watts rate of heat dissipation in heater 67 times the effective thermal resistance of the cell, is equal to the desired ultimate steady-state temperature-rise AP. A simple way to do this is to make a calibrating test run at any convenient constant wattage input to the heater 67 and to determine therefrom the curve of temperature-rise versus time for the temperature-rise between the junctions 80 and 82. This calibrating test is performed at the zero-ballast condition (all ballast removed from chamber 62) for purposes which will be brought out later. The heater 67 is then adjusted so that it will produce temperature-rise AP, by making its wattage input equal to the calibrating wattage times the ratio of the desired temperature-rise AP to the steady-state or ultimate temperature-rise resulting from the calibrating test run.

A similar calibrating test is made for the large cell B and from the data obtained, the heater 36 is adjusted in like manner so that the product, heater wattage times effective thermal resistance, is equal to BP. It is thus apparent that, under steady-state load conditions, the indicator 92 will read the temperature-rise of point 108 above its initial or no-load temperature. Also, it is evident that the current flowing through heaters 36 and 67 will be proportional to that in the transformer 110.

In Equation 2, the product AP represents an ultimate temperature-rise as explained above, and the parenthetical expression $(1-e^{-at})$ is a transient effect which expresses the proportion of the ultimate temperature-rise AP that is effective at any given time after application of the constant load. In a thermal circuit, this transient effect is produced by the presence of thermal capacitance. Thermal capacitance is that property of a material by virtue of which it stores heat when its temperature is raised. A convenient unit of thermal capacitance is the watt-hours stored per degree centigrade of temperature-rise. When so measured, the thermal capacitance of a material is 1.162 times the product of the specific heat by the weight in kilograms.

In my device, this transient effect for the A-term, is produced by properly proportioning the effective thermal capacitance of the cell A to its effective thermal resistance. The proportion must be such that $1/a$, the time-constant, equals the product of the effective thermal resistance of the cell A by its effective thermal capacitance. The effective thermal capacitance of the cell A is adjusted to the proper value by suitably changing the amount of thermal ballast in chamber 62. From the curve of temperature-rise versus time obtained from the calibrating test run, an effective zero-ballast time-constant is obtained which is the product of the effective thermal resistance by the effective thermal capacitance for the zero-ballast condition. The approximate amount of thermal capacitance required to be added as ballast to produce the desired time-constant $1/a$, in the cell A, is equal to the ratio, of calibrating wattage to desired ultimate temperature-rise AP, multiplied by the difference between said time-constant $1/a$ and the zero-ballast time-constant. A check-test curve of temperature-rise versus time is then obtained for cell A, having an effective time-constant which may differ from the desired time-constant by some small amount that can be compensated for by a corresponding final adjustment of the ballast.

Similarly, the amount of thermal ballast in chamber 14 is adjusted so that the time-constant, the product of the effective thermal resistance of the cell B by its effective thermal capacitance, is equal to the desired time-constant $1/b$.

When the foregoing adjustments of heaters and thermal ballasts have been properly made, the characteristic response of cell A will be represented by the A-term and the characteristic response of cell B by the B-term of Equation 2, and the indicator 92 will register the sum of the responses of the two cells, which is for all practical purposes the temperature-rise of the point 108 at any time after the constant load has been applied to transformer 110.

To anyone familiar with the art, it will be evident that an artificial thermal circuit, which has a temperature-rise the same at all times as that of a proportionally heated prototype circuit after a constant load impulse is applied, will undergo the same temperature changes as the prototype circuit for all conditions of loading. When my artifice is adjusted to produce the response of the empirical Equation 2, it will for all practical purposes reproduce all temperature changes of the prototype due to loading. Therefore, the indicator 92 of my artifice will indicate for practical purposes the amount by which the temperature of point 108 exceeds a given no-load temperature, for any condition of loading on transformer 110.

In the practical operation of my artifice, the prototype equipment being supervised may be loaded without regard to magnitude of current, until such time as the pointer 100 reaches the green line 104, indicating that the hot-spot has reached the maximum permissible temperature-rise for normal operations. The red line 106 indicates the maximum permissible temperature-rise for emergency operations. After having reached the appropriate temperature limit, the current is adjusted or controlled to prevent that limit from being exceeded.

In the foregoing, my artifice has been described as being adjusted so that the sum of the temperature rises in the cells A and B is for all practical purposes the same as that of the point 108 in the prototype equipment. It should be appreciated, however, that the temperature-rises in the two cells may be proportionately adjusted so that their sum will be any desired multiple of that at the point 108, to produce in effect a magnified image of the temperature changes in the prototype. This may be accomplished merely by appropriate proportional increases in the wattage inputs to the heaters 36 and 67, and by suitably calibrating the indicator 92. This changes the ultimate temperature rises without affecting the time constants. In fact, I prefer to operate my artifice with temperature changes at least twice those in the prototype so that changes in the cold junction temperature, due to changes in room temperature, will have relatively much less effect on the indicated temperature rise. Also, this results in increased power for operating the indicator 92 so that a relatively less sensitive instrument will suffice, or so that recorders, relays, controllers, contact-making millivoltmeters, compensators, or the like, may be included in the thermocouple circuit to operate concurrently with or as substitutes for the indicator 92.

The cold junction 46 is shown positioned in the cell B at a point whose temperature is intermediate between that of the outer surface of wall 42 and the hot junction 48. This has the effect of making the temperature response relatively insensitive to incidental fluctuations of room temperature. Also, this position may be adjusted by suitably changing the number of the shims 44 so as to obtain a fine adjustment of indicated temperature-rise in the cell without materially affecting its time constant. In fact, this adjustment may be used in lieu of adjusting the heater wattage. The cell A has provisions for similar adjustment of its cold junction position.

While I prefer to make my artifice relatively insensitive to transient effects of room temperature changes as previously explained, it is possible to compensate for such effects when desired. For this purpose, as illustrated in Fig. 3, I use a second artifice comprising cells A' and B', identical respectively with cells A and B, constructed, adjusted and calibrated to be identical with the first artifice reproducing the temperature rise in the prototype equipment except that its indicator has been removed. Said second artifice has its heater circuit disconnected or otherwise idle, and has its thermocouple circuit inserted in series with the indicator of the first artifice, which is illustrated as a recording millivoltmeter 92', but with the electromotive force of said second artifice bucking that of the first artifice. When the two artifices are so connected, any changes in room temperature will produce opposite and cancelling effects in the indicator circuit.

The foregoing presentation has been simplified as much as possible for purposes of explaining how the preferred embodiment of my artifice functions. For this reason, I have referred only to the effective thermal resistance and effective thermal capacitance of the cells. Actually, each of the materials used has thermal resistance and thermal capacitance inseparably distributed throughout. My method of determining the effective values of thermal resistance and thermal capacitance takes this factor into account as well as the effect of the relative temperature distribution in the material. There are also present certain external properties comprising the thermal capacitance of the cool parts and the thermal resistance in the path of heat flow from the cool parts to ultimate dissipation of heat from the cell. In the artifice of Fig. 1, I suppress any transient effects of these external properties to the point where they practically vanish, by designing each of the cells A and B so that the product of its external thermal resistance by its external thermal capacitance is less than one-half the product of its effective thermal resistance by its effective thermal capacitance. My method of calibration compensates for the steady-state effects of said external properties in each of said cells.

I minimize the effects of fluctuations in external air currents by designing the cells to operate at exterior surface temperatures only slightly above room temperature. This also further suppresses the effects of the aforesaid external properties.

The time-constants of Equation 2 are, in general, of different magnitudes. I prefer to consider the term with the smaller time-constant as being the A-term. The A-term then accounts for the greater part of the rapid temperature changes or transients, while the B-term represents largely the slow changes. The capacitance of cell A will, therefore, be smaller than the capacitance of cell B, which accounts essentially for the difference in size, the cell A being in general substantially the smaller.

In the small cell A, it is desirable that the hot junction 82 be positioned on the shoe 20' at a point approximately beneath the wall of chamber 62 which separates said chamber from the compartment 66. This construction serves to increase the sensitivity of the cell, by reducing the small interval of time which may elapse while the temperature change caused by a rapid change in heater current is being conducted to the hot junction by way of the distributor. It also utilizes a part of the natural temperature gradient in the distributor to increase the sensitivity of the hot junction to the temperature changes accompanying any rapid changes in heater current. In fact, I may obtain some overcompensation for rapid temperature changes when desired by positioning the hot junction near to or on the upright portion of the distributor.

As has been observed previously, it is not essential that my artificial thermal circuit have more than one heater and, therefore, it need not be divided into two cells. Fig. 4 shows a modification of my artifice using only one heater in a single composite cell which can be constructed readily. In this modification an adjustable heater 67', supplied with current proportional to that in a prototype equipment 110' is in an assembly comprising a heater compartment 66', a chamber 62' containing adjustable thermal ballast consisting of metal plates 16 and liquid 18, a heat distributor 20' conducting heat to said thermal ballast and a thermocouple hot junction 82' on said heat distributor. Separated from this assembly by a thermal resistance 78' of resiliently compressible material such as glass wool and receiving from said assembly heat through said thermal resistance 78', is a second assembly comprising a heat distributor 20'' and a chamber 14' containing similar adjustable thermal ballast. For adjustment of the thermal resistance between the two assemblies, the second assembly is slidably mounted in suitable guides on a base 120 for horizontal movement toward and away from the first assembly as driven by a thumb screw 122. The whole of both said assemblies and intervening thermal resistance 78' is surrounded by an envelope of thermal insulation 78'. This envelope in turn is enclosed within an external housing 74', which may be of any desired material.

A thermocouple cold junction 46' and associated thermal collector 40' are positioned within the envelope of thermal insulation to assume a temperature such that the difference between it and the temperature of the second chamber is any desired proportion of the temperature difference between said second chamber and the outer wall of the housing 74'. This proportion is made adjustable by adjusting the thickness of insulation between the thermal collector 40' and the second chamber 14' by means of thumb screws 124 screw-threaded into the wall of the enclosure 74'. An indicator circuit includes the hot and cold junctions and a suitable indicator or recorder 92'. As described for the device illustrated in Fig. 1, this modification may be adjusted to produce in effect an image of the temperature-rise in any prototype electric equipment.

Where adjustability is not required, I may make use of a simplified modification illustrated in Figs. 5 and 6 in which the parts have fixed thermal constants. In this simplified modification, I provide a heater element 67'' with an associated thermal mass 130, a second thermal mass 132, a first unit 134 of thermal resistance interposed between said thermal masses, and a second unit 136 of thermal resistance associated with and receiving heat from said second thermal mass 132. The heater 67'' is supplied with current proportional to that in a prototype electric equipment 110'. A thermocouple circuit having a hot junction 82'', a cold junction 46'', and a recorder 92' is provided to register the temperature difference between the first thermal mass 130 and a point 138 in said second unit 136 of thermal resistance. This can be considered as a series thermal circuit in which heat flow is to a first thermal capacitance, thence through a first thermal resistance to a second thermal capacitance from which it is dissipated through a second thermal resistance. When the thermal resistances and capacitances are properly proportioned, this device will produce an image of the temperature-rise in the prototype.

While Fig. 1 illustrates the use of my device to indicate a temperature-rise for which in general both the A-term and the B-term of Equation 2 have the same algebraic sign, my artifice may be adapted as well to the representation of temperature-rise under conditions in which the respective terms have opposite signs. An example of this would be the temperature-rise of the oil in a transformer. In such cases, the A-term would be negative and the connections to terminals 84 and 86 should be reversed. In the modifications described, this same effect would be produced by observing the temperature-rise of the second thermal mass rather than the first.

Although my artifice has been shown as energized with current proportional to that in the prototype by way of a current transformer, it is obvious that any other means of obtaining the proportional current will suffice. For example, to indicate the temperature rise in a direct-current field coil of a generator or motor, the heater of my artifice may be placed in parallel with the voltage impressed on said coil.

When the heater is supplied by a current transformer as shown in Fig. 1, it is well to use the method of adjustment indicated, in which resistor turns are short-circuited to reduce the heater wattage, thereby reducing the probability of accidentally open-circuiting the current transformer secondary. For the purposes of facilitating calibration, I prefer to use a heater element whose resistance does not change appreciably with changes in its operating temperature. Also, though the heat distributor is shown as a separate part, it is obvious that its function can be performed by the walls of the chambers 14 and 62 when suitably designed. The relatively good heat conducting properties of copper favor its use for heat distribution.

Although I use steel for the chambers 14 and 62 in Fig. 1, and a thermal ballast of steel plates and mercury, it should be understood that other materials may be used. The mercury not only serves the purpose of providing good thermal transmission between the chamber surface and the steel plates, but also facilitates fine adjustment of the thermal ballast and it may be subjected to relatively high operating temperatures without likelihood of evaporation or other undesirable effects. I use steel because it has a large thermal capacitance per unit of volume and does not amalgamate readily.

While Fig. 1 illustrates the use of my artifice as an indicator, it will be evident to anyone familiar with the art that it is possible, if desired, to use a contact making device in the indicator circuit for the purpose of automatically giving an alarm or reducing the load current in the prototype equipment when its temperature-rise becomes excessive. I may adapt the indicator to this purpose by placing a contact on its pointer and movable therewith and a maximum-limit contact on its scale, by means of which contacts an external control circuit may be actuated to reduce the current in the prototype or give an alarm when the pointer reaches the limit. Similarly, I may also place a minimum-limit contact on the scale to actuate a second external control circuit for increasing the load current or giving an alarm when the pointer reaches said minimum-limit. It is also obvious that, in the artifice of Fig. 1, the recorder 92' may be substituted for the indicator 92.

When my artifice is used with polyphase equipment, it is usually sufficient to adjust it so that it indicates the temperature-rise at the hottest spot of the most heavily loaded phase, but one of my artifices could be used on each of as many phases as desired.

In some instances, as in the case of open wire, Equation 2 reduces to one term for all practical purposes and in such instances only one cell of the device shown in Fig. 1 would be used.

In the artifice of Fig. 1, I have not specified the particular thermocouple elements, because any of the materials ordinarily used will be satisfactory. However, I prefer to use copper for the element brought out to the terminals so as to avoid thermoelectric effects in the external circuit for all of which I also use copper.

Although the cells can be calibrated to operate in conjunction with any particular mounting, I find it is helpful to calibrate and mount the cells under conditions which permit essentially free air circulation around all surfaces of the cell.

Though the invention has been described in considerable detail, such description is intended as illustrative rather than limiting, as numerous embodiments will be apparent to those skilled in the art.

I claim:

1. In a temperature-rise indicator for equipment connected in an electric circuit, a heat cell comprising an electric heating resistor adapted to be connected to said electric circuit, a thermal mass associated with said resistor and arranged to receive heat therefrom, a unit of thermal resistance associated with said thermal mass and arranged to control dissipation of heat from said resistor and said thermal mass, said heat cell having a heating characteristic which is directly proportional to the heating characteristic of said equipment, and means to indicate the difference in temperature between said thermal mass and a selected point in said thermal resistance.

2. The combination of equipment connected in an electric circuit and having parts carrying current, and a temperature-rise indicator having two heat cells, each comprising a current-carrying heating resistor, a thermal mass associated with said resistor and arranged to receive heat therefrom, a unit of thermal resistance associated with said thermal mass and arranged to control dissipation of heat therefrom, and a thermocouple circuit having a hot junction in thermal contact with said thermal mass and a cold junction within said thermal resistance and having leads brought out externally of the cell, the resistors of said cells being connected in said electric circuit and carrying current proportional to the current in the equipment, a millivoltmeter, and the thermocouple circuits of each cell and said millivoltmeter being connected in series.

3. The invention set forth in claim 2 characterized in that in each cell the thermal mass includes a chamber containing thermal ballast and heat distributor adapted to be heated by the resistor and to conduct heat to said ballast, and the hot junction being in good thermal contact with said distributor.

4. The invention set forth in claim 2 characterized in that each cell includes a metal plate within the thermal resistance, and the cold junction being in good thermal contact with said plate.

5. A temperature-rise indicator comprising an adjustable heater element, a first thermal mass associated with said element and arranged to receive heat therefrom, a second thermal mass, a first unit of thermal resistance interposed between said thermal masses for control of heat flow from the first thermal-mass to the second thermal mass, a second unit of thermal resistance associated with said second thermal mass and arranged to control dissipation of heat therefrom, and means for indicating the difference in temperature between said first thermal mass and a selected point in said second unit of thermal resistance.

6. The invention set forth in claim 1 characterized in that said heat cell has a surrounding enclosure, said mass, said unit and the enclosure being proportioned in such a way that the product of the effective thermal capacitance of said mass by the effective thermal resistance of said unit is greater than twice the product of the effective thermal capacitance of the enclosure by the effective thermal resistance from said point to ultimate dissipation of heat from said cell.

7. The combination of equipment connected in an electric circuit and having parts carrying electric current, and a temperature-rise indicator comprising a current carrying heating resistor, a first thermal mass associated with said resistor and arranged to receive heat therefrom, a second thermal mass, a first unit of thermal resistance interposed between said thermal masses for control of heat flow from the first thermal mass to the second thermal mass, a second unit of thermal resistance associated with said second thermal mass and arranged to control dissipation of heat therefrom, said equipment and said resistor being connected in the electric circuit in such manner that the current in said equipment and in said resistor are proportional to each other, and means for indicating the difference in temperature between said first thermal mass and a selected point in said second unit of thermal resistance.

8. In a temperature-rise indicator for electric equipment, a heater element, a first thermal mass associated with said element and arranged to receive heat therefrom, a second thermal mass, said thermal masses each consisting of one or more removable thermal ballast elements, a first unit of thermal resistance interposed between said thermal masses for control of heat flow from the first thermal mass to the second thermal mass, a second unit of thermal resistance associated with said second thermal mass and arranged to control dissipation of heat therefrom, said units being capable of having their effective thermal resistances adjusted, and means for adjusting the effective thermal resistance of each of said units, said heater element and associated thermal masses and units of thermal resistance having a combined heating characteristic which is directly proportional to the heating characteristic of said equipment.

9. In a temperature-rise indicator for electric equipment, a heater element, a first thermal mass associated with said element and arranged to receive heat therefrom, a second thermal mass, said thermal masses each consisting of one or more removable thermal ballast elements, a first unit of thermal resistance interposed between said thermal masses for control of heat flow from the first thermal mass to the second thermal mass, a second unit of thermal resistance associated with said second thermal mass and arranged to control dissipation of heat therefrom.

10. In a temperature-rise indicator for electric equipment, a heater element, a first thermal mass associated with said element and arranged to receive heat therefrom, a second thermal mass, one of said thermal masses consisting of one or more removable thermal ballast elements, a first unit of thermal resistance interposed between said thermal masses for control of heat flow from the first thermal mass to the second thermal mass, a second unit of thermal resistance associated with said second thermal mass and arranged to control dissipation of heat therefrom.

11. In a temperature-rise indicator for electric equipment, a heater element, a first thermal mass associated with said element and arranged to receive heat therefrom, a second thermal mass, a first unit of thermal resistance interposed between said thermal masses for control of heat flow from the first thermal mass to the second thermal mass, a second unit of thermal resistance associated with said second thermal mass and arranged to control dissipation of heat therefrom, said units being capable of having their effective thermal resistances adjusted, and means for adjusting the effective thermal resistance of each of said units, said heater element and associated thermal masses and units of thermal resistance having a combined heating characteristic which is directly proportional to the heating characteristic of said equipment.

12. In a temperature-rise indicator for electric equipment, a heater element, a first thermal mass associated with said element and arranged to receive heat therefrom, a second thermal mass, a first unit of thermal resistance interposed between said thermal masses for control of heat flow from the first thermal mass to the second thermal mass, a second unit of thermal resistance associated with said second thermal mass and arranged to control dissipation of heat therefrom, one of the units being capable of having its effective thermal resistance adjusted, and means for adjusting the effective thermal resistance of said one of the units, said heater element and associated thermal masses and units of thermal resistance having a combined heating characteristic which is directly proportional to the heating characteristic of said equipment.

13. The invention set forth in claim 2 characterized in that said millivoltmeter is of the recording type.

14. The invention set forth in claim 1 characterized in that said resistor is adjustable.

15. The invention set forth in claim 1 characterized in that said thermal mass consists of one or more removable thermal ballast elements.

16. The invention set forth in claim 1 characterized in that said unit is capable of having its effective thermal resistance adjusted, and including means for adjusting the effective thermal resistance of said unit.

17. An artifice for indicating the temperature rise in electrical equipment connected in an electric circuit, comprising two heat cells differing substantially from each other in heating characteristics and physically separate from said equipment, each of said cells comprising an electric heating resistor adapted to be connected to said electric circuit, a thermal mass associated with said resistor and arranged to receive heat therefrom, and a unit of thermal resistance associated with said thermal mass and arranged to control dissipation of heat therefrom, the combined heating characteristics of said cells being directly proportional to the heating characteristics of said equipment whereby they function in combination as a thermal equivalent of said equipment, and a temperature indicator constructed and arranged to indicate the sum of the difference in temperature between the thermal mass of one cell and a selected point in its associated thermal resistance and the difference in temperature between the thermal mass of the other cell and a selected point in its associated thermal resistance.

ALLAN H. KIDDER.

REFERENCES CITED

The following references are of record in the file of this patent:

UNITED STATES PATENTS

| Number | Name | Date |
|---|---|---|
| 1,069,373 | Bell | Aug. 5, 1913 |
| 1,281,482 | Baruch | Oct. 15, 1918 |
| 1,308,048 | Crichton | July 1, 1919 |
| 1,429,660 | Warner | Sept. 19, 1922 |
| 1,477,455 | Simmon | Dec. 11, 1923 |
| 1,643,582 | Martin | Sept. 27, 1927 |
| 1,721,556 | Harrison | July 23, 1929 |
| 1,940,599 | Marrison | Dec. 19, 1933 |
| 2,050,633 | Stallard | Aug. 11, 1936 |
| 2,154,927 | Yaglou | Apr. 18, 1939 |